May 16, 1944.  E. P. BOLEN ET AL  2,349,140
TRIM PANEL
Original Filed June 16, 1941
FIG.1.
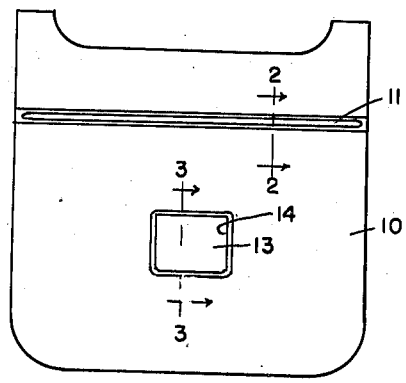
FIG.2.
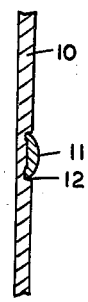
FIG.3.
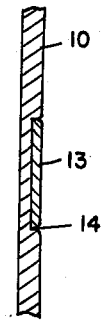
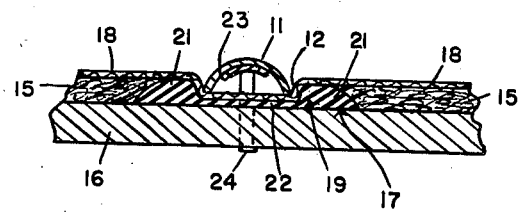
FIG.4.
INVENTORS
EDWARD P. BOLEN
BY  EDWARD R. DETRICK
ATTORNEYS Patented May 16, 1944

2,349,140

UNITED STATES PATENT OFFICE 2,349,140

TRIM PANEL

Edward P. Bolen and Edward R. Detrick, Detroit, Mich., assignors to National Automotive Fibres, Inc., Detroit, Mich., a corporation of Delaware Original application June 16, 1941, Serial No. 398,324. Divided and this application November 30, 1942, Serial No. 467,407

3 Claims. (Cl. 45—138)

This invention relates generally to trim panels and means for decorating the same, and constitutes a division of our application filed June 16, 1941, bearing Serial No. 398,324 which has become U. S. Patent No. 2,317,583 on April 27, 1943.

Heretofore molding strips have been employed to impart a decorative effect to trim panels, however such strips usually consisted of bars or strips of metal having rounded exterior surfaces that have been chromium plated or otherwise treated to provide a desirable appearance.

In the past these molding strips have been applied to the flat outer surface of the upholstery material of a trim panel, with the result that they stand out to an undesirable degree and have exposed corners, hence they provide a less decorative appearance than is desirable.

According to the present invention we prefer to modify the prior constructions by providing a "debossing" effect on the trim panel. This is carried out by one of several means disclosed herein, and the effect is to provide a panel board in which the trim fabric overlying the panel board forms a debossed channel, or groove, or hollow for the reception of trim molding or other decorative element. Specifically, this effect is carried out by elevating the trim fabric at the sides of the channel.

The invention is equally applicable to improve the appearance of plaques or other decorative insignia or emblems which may be attached to trim panels.

An object of the present invention is to improve the appearance of interior trim panels provided with decorative plaques or trim molding strips by providing a debossed groove or recess for the reception of the plaque or molding strip.

Other objects of the invention will be apparent as the description proceeds, and when taken in conjunction with the accompanying drawing, wherein:

Figure 1 is a front elevation of a trim panel to which, for purposes of illustration, we have shown applied both a trim molding strip and a decorative plaque;

Figure 2 is a schematic section, on an enlarged scale, taken on the line 2—2, Figure 1;

Figure 3 is a schematic section, on an enlarged scale, taken on the line 3—3, Figure 1;

Figure 4 is a fragmentary section through a trim panel illustrating a preferred method of providing a molding strip.

A trim panel used in the interior trim of automotive vehicles normally has a panel board, which may be of an asphalt or bituminous impregnated fibrous material. To this trim panel padding material is normally applied, and over the padding material a fabric is applied which is the same or harmonizes with the fabric employed in the seats and backs of the vehicle.

In Figure 1 we have illustrated the front elevation of such a trim panel 10 to which a molding strip 11 is applied, the molding strip being seated in a debossed groove indicated at 12. In the same figure we have shown a plaque or other decorative emblem 13 which is seated in a debossed recess indicated at 14. Figures 2 and 3 show enlarged sections through the molding strip 11 and the plaque 13, and illustrate the construction. It will be appreciated that in Figures 2 and 3 the trim panel 10 is indicated as unitary, and no effort is made to show therein the panel board and trim fabric separately.

Referring now to Figure 4 we have illustrated one embodiment wherein padding material 15 is spaced apart on the panel board 16 and cooperates therewith to provide an outwardly opening channel shaped recess 17. In this construction a single trim fabric 18 is employed as a cover for the padding material 15 upon opposite sides of the recess 17, and such trim fabric preferably overlies a formed rubber element 19 within the recess 17 so as to provide the debossment 12.

In producing the structure illustrated in Figure 4 a thin strip of uncured soft readily vulcanizable rubber is first attached to the panel board 16 along the line of the proposed decoration. The thin strip of rubber will normally be of uniform thickness, the thickness being such as to provide sufficient material to be formed into the risers 21. A heated die element (not shown) is then brought down in pressure contact with the upper surface of the trim fabric 18 so that heat from the die will soften the rubber. The continued application of pressure causes the rubber to flow out laterally from beneath the die element and to form the raised beads or risers 21. The die element is retained in pressure contact with the fabric 18 for an interval sufficient to effect substantial vulcanization of the rubber so that the rubber retains its displaced shape when the die element is withdrawn.

During the application of pressure all of the rubber except a thin film 22 is displaced from beneath the die element, and this thin film 22 becomes fluid and vulcanizes the trim fabric 18 to the panel board 16 so as to permanently secure the same thereto. The heated die element is of course of the precise width desired in the debossment, and after the die element has been withdrawn, the molding strip 11 is attached thereto in any convenient manner, for example by a strip 23 fixed to the underside of the molding strip 11 and having prongs 24 anchored to the panel board 16.

In applying the decorative plaque, such as shown at 13 in Figures 1 and 3, any suitable method may be employed to provide a debossment of any desired shape or size. Thus for example, while we have illustrated a generally rectangular plaque in Figure 1, it will be appreciated that the same might be circular, or might conform to the shape of an advertising emblem if desired. The plaque 13 may be secured in any convenient manner as by stapling, or by prongs.

The result of the provision of a debossment for the reception of a plaque or trim molding is to improve the appearance of the completed article. Instead of the plaque or trim molding having the appearance of being crudely attached to a flat surface of a trim fabric it appears to be set into the article, with the result that the completed article has an appearance of richness unattainable in previously known constructions. At the same time, by providing the debossment defined by beads or ridges surrounding the debossment, the edges of the plaque or molding strip may be concealed to any desirable extent, which is oftentimes rendered necessary or desirable by their unfinished condition.

Trim panels of this type are oftentimes provided with padding material in the form of very light fluffy cotton. It is this type of material which is illustrated in Figure 4. By the provision of risers 21, it is possible to define a groove or recess with great exactness and to impart a smooth finished appearance to the fabric at the point where it is debossed over the risers into the recess. It will be appreciated of course that the invention may be practiced without padding material on the panel board, in which case the beads in the fabric formed by the riser elements provide what may be termed frames for the molding strips or plaques.

While we have illustrated one embodiment of our debossment for the reception of plaques, molding strips, and similar articles, and have referred specifically to its use in decorating automotive trim panels, it will be understood that the invention is susceptible to use in widely varying fields, and the foregoing complete description has been given merely to enable those skilled in the art to practice the invention, the scope of which is indicated by the appended claims.

What we claim as our invention is:

1. A trim panel having a panel board, padding material spaced apart on said panel board and cooperating therewith to provide an outwardly opening channel shaped recess, a formed strip of plastic material within and extending longitudinally of said recess, said strip having a thin flat base in surface to surface relation with the bottom of said recess and having at opposite longitudinal side edges of said base relatively thick riser portions cooperating with the flat base to provide an outwardly opening channel, the riser portions being at opposite sides of the recess aforesaid and substantially flush with the outer surface of the padding material, a single trim fabric extending over the padding material upon opposite sides of said recess and extending over said riser portions, said trim fabric having a depressed portion within said channel in surface to surface relation with the bottom and sides thereof, an arched molding strip within said channel opening toward and having its longitudinal side edges bearing against the depressed portion of the trim fabric adjacent the riser portions, and attaching means for the molding strip fixed to the underside thereof and extending through the depressed portion of the fabric and the base of the formed strip and anchored to the panel board.

2. A trim panel having a panel board, padding material spaced apart on said panel board and cooperating therewith to provide an outwardly opening channel shaped recess, a formed strip of plastic material within and extending longitudinally of said recess, said strip having a thin flat base in surface to surface relation with the bottom of said recess and having at opposite longitudinal side edges of said base relatively thick riser portions cooperating with the flat base to provide an outwardly opening channel, the riser portions being at opposite side of the recess aforesaid and substantially flush with the outer surface of the padding material, a single trim fabric extending over the padding material upon opposite sides of said recess and extending over said riser portions, said trim fabric having a depressed portion within said channel in surface to surface relation with the bottom and sides thereof, a molding strip within said channel and bearing against the depressed portion of the trim fabric adjacent the riser portions, and attaching means for the molding strip fixed thereto and extending through the depressed portion of the fabric and the base of the formed strip and anchored to the panel board.

3. A trim panel having a panel board, padding material spaced apart on said panel board and cooperating therewith to provide an outwardly opening channel shaped recess, a formed strip of plastic material within and extending longitudinally of said recess, said strip having a thin flat base in surface to surface relation with the bottom of said recess and having at opposite longitudinal side edges of said base relatively thick riser portions cooperating with the flat base to provide an outwardly opening channel, the riser portions being at opposite sides of the recess aforesaid and substantially flush with the outer surface of the padding material, a single trim fabric extending over the padding material upon opposite sides of said recess and extending over said riser portions, said trim fabric having a depressed portion within said channel in surface to surface relation with the bottom and sides thereof, and a molding strip within said channel and anchored to said panel board, said molding strip clamping the depressed portion of the trim fabric against the bottom of the channel adjacent the sides thereof.

EDWARD P. BOLEN.
EDWARD R. DETRICK.